June 14, 1949.  A. H. AHRNDT  2,472,800
KNIFE ASSEMBLY AND STRIPPER FOR
MEAT TENDERING MACHINES Filed Nov. 18, 1944  5 Sheets-Sheet 1

Fig.1

Inventor
Arthur H. Ahrndt,
By Spencer, Marzall, Johnston & Cook,
Attys

A. H. AHRNDT 2,472,800

KNIFE ASSEMBLY AND STRIPPER FOR
MEAT TENDERING MACHINES

Filed Nov. 18, 1944

Inventor
Arthur H. Ahrndt,
By Spencer, Marzall, Johnston & Cook
Attys

Patented June 14, 1949

2,472,800

UNITED STATES PATENT OFFICE 2,472,800

KNIFE ASSEMBLY AND STRIPPER FOR MEAT TENDERING MACHINES

Arthur H. Ahrndt, La Porte, Ind., assignor to U. S. Slicing Machine Company, La Porte, Ind., a corporation of Indiana Application November 18, 1944, Serial No. 564,034

30 Claims. (Cl. 17—26)

This invention relates to a meat tendering machine in general, and particularly to a meat tendering machine having knife roll assemblies through which the meat to be tenderized is fed. More specifically, the invention relates to knife roll assemblies and stripper means co-operating with each knife roll assembly.

An important object of the invention is the provision of knife roll assemblies and a stripper member co-operating with the knife roll assemblies, whereby each knife roll assembly is detachable from the machine by the mere removal of a stripper member or element which is associated with each knife roll assembly.

Another object of the invention is the application of a knife roll assembly which may be quickly applied or removed without having the operator's hands come in direct contact with the knives of the roll assemblies.

Another object of the invention resides in the provision of improved means embodying a safety feature, whereby each knife roll may be inserted or removed without having the operator's hands come in contact with the knives, and which permits the knife rolls to be removed along with the stripper members and the removal of knife rolls from the stripper members, instead of first removing the stripper members as in conventional machines.

A further object of the invention resides in the provision of a new and improved stripper member which maintains the spacer bars or elements in proper alined position, preventing the shifting of the bars laterally as well as maintaining the said bars always in the proper plane.

A still further object of the invention resides in the provision of a rigid stripper member of a unitary construction, there being means carried by the stripper members to support operatively the knife roll assemblies during removal of the knife rolls from the machine or the insertion of the rolls into the machine.

Still another object of the invention resides in the provision of a stripper member or element so constructed and arranged that sinews from the meat to be tenderized will be prevented from winding around the knife rolls, there being improved means for supporting rigidly the spacer bars of the stripper member to maintain them in proper spaced relation and operatively to support the knife roll assemblies during insertion or removal of the assemblies in the machine.

A still further object of the invention resides in the provision of a stripper member and roll support, the elements being so constructed and arranged that positioning of the roll with respect to its co-operating stripper member will be in only one position whereby it would be impossible to insert the roll for co-operation with a wrong stripper.

Numerous other objects and advantages will be apparent throughout the progress of the specification which follows.

The accompanying drawings illustrate a selected embodiment of the invention and the views therein are as follows.

Figure 1:
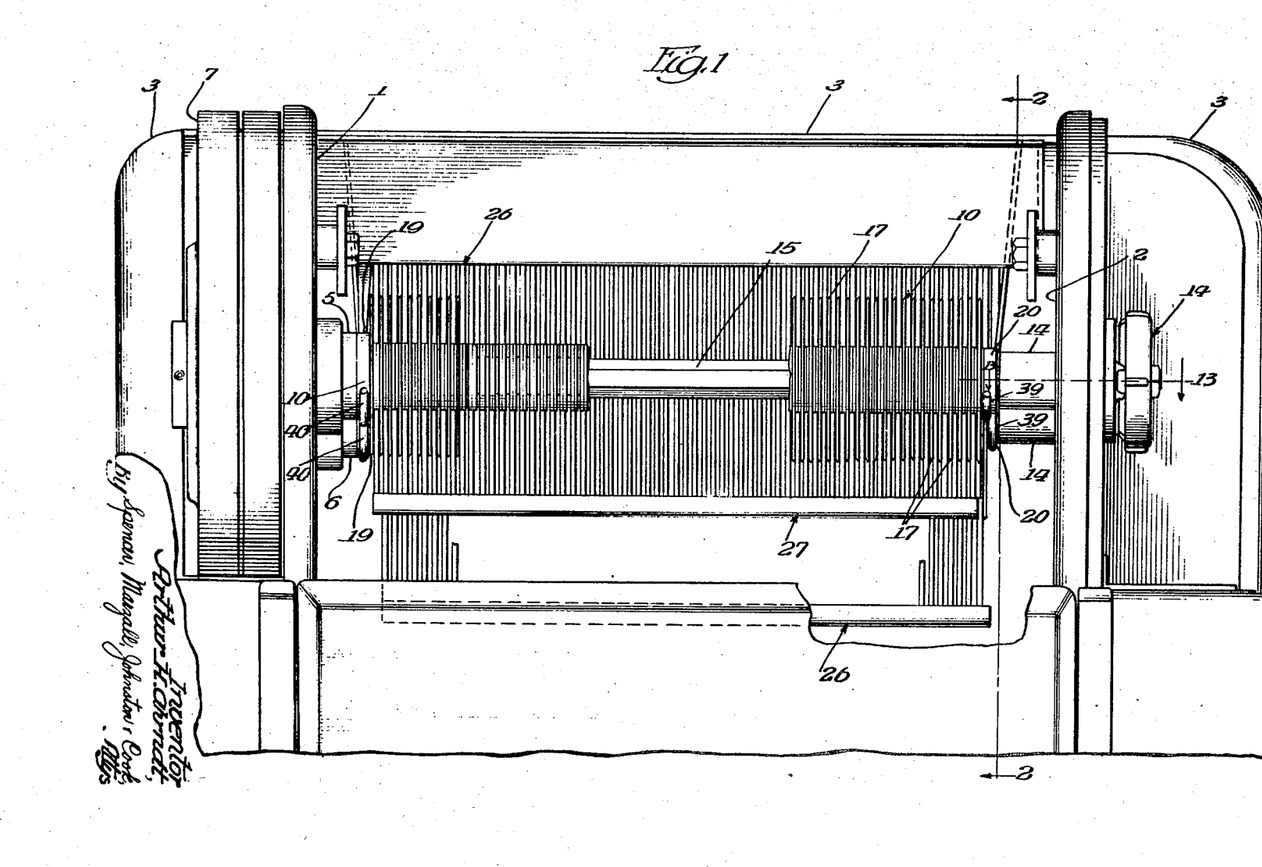
Fig. 1 is a detail front elevational view of a meat tendering machine and embodying the invention, the parts being in normal operative position but with the front cover omitted.
Figure 2:
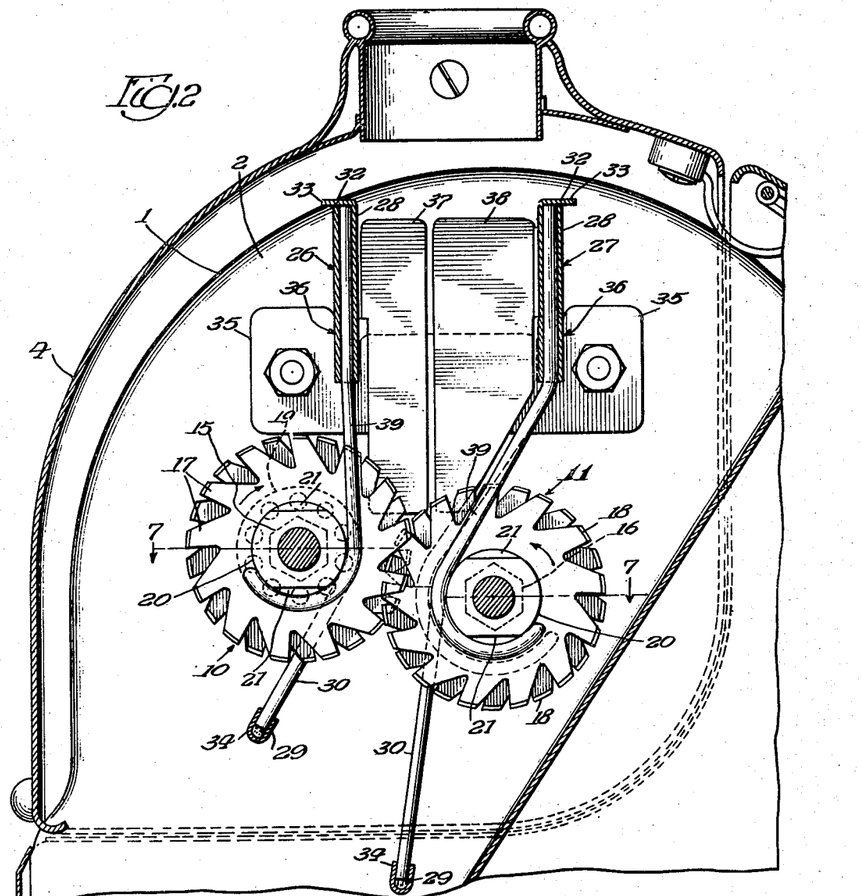
Fig. 2 is a detail sectional view on the line 2—2 of Fig. 1.
Figure 6:
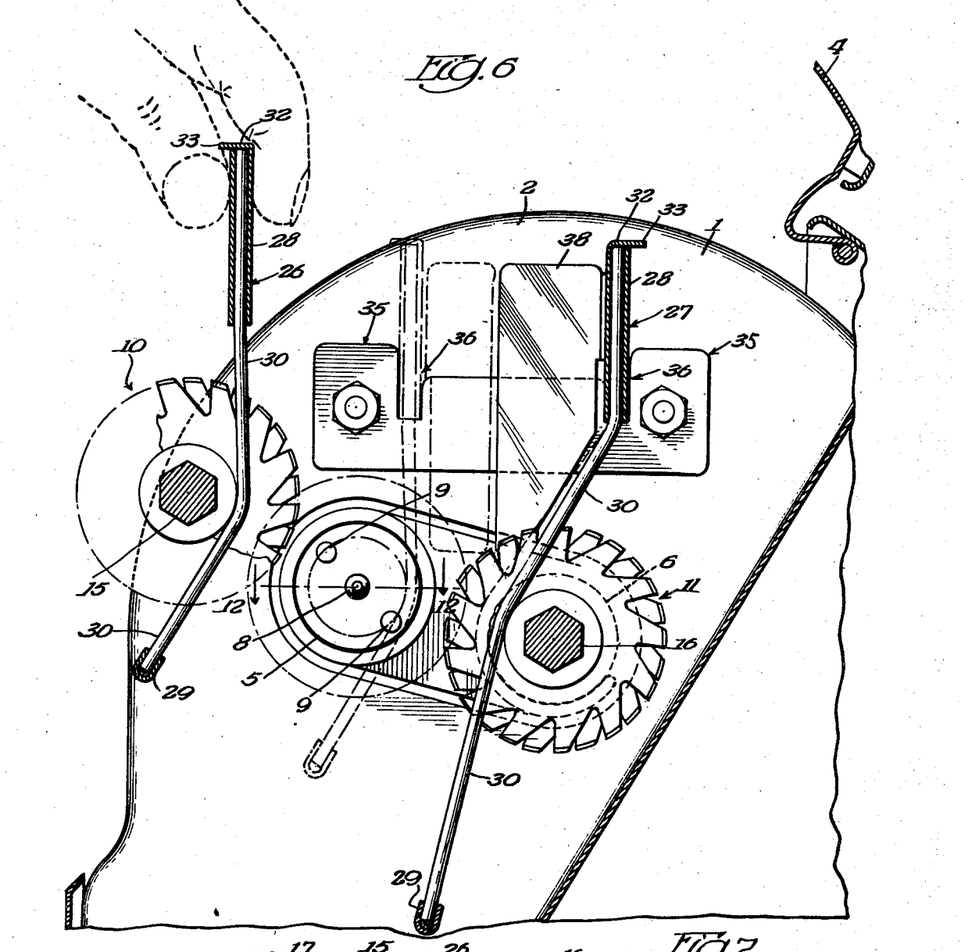
Fig. 6 is a detail sectional view on the line 6—6 of Fig. 5 but showing a stripper member and its associated knife roll assembly removed from its normal operative position.

The particular meat tenderer or tendering machine herein shown for the purpose of illustrating the invention may be of the type shown in applicant's co-pending application Serial No. 455,561, filed August 21, 1942, now Patent No. 2,409,463, which issued October 15, 1946, and assigned to the present assignee. This application issued as Patent No. 2,409,463, October 15, 1946. The machine shown herein, as well as the machine shown in the aforesaid application, comprises a suitable supporting base, a frame or supporting structure which includes opposed side walls 1 and 2, and a housing 3 having a hingedly mounted closure or cover 4, Figs. 1, 2, and 6. Front and rear driving members 5 and 6, respectively, Figs. 1, 2, and 6, are mounted on the side wall 1 and driven from a drive wheel 7 through elements not shown herein but shown in the said co-pending application, it being sufficient in this application merely to state that the members 5 and 6 are driven. The driving members 5 and 6 each includes a centering pin 8 and one or more driving pins 9, Figs. 1, 6, and 12.

Figure 4:
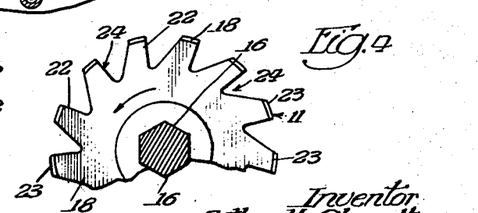
Figure 5:
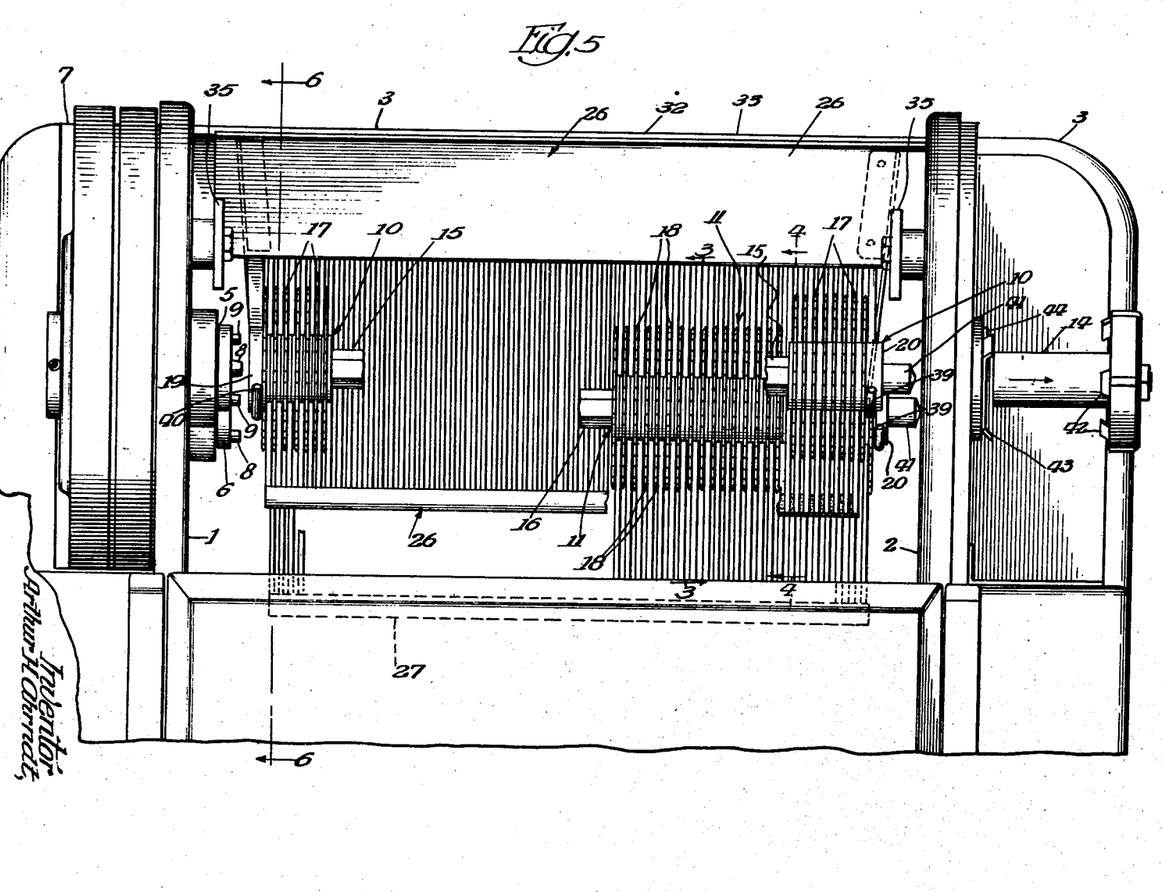
Fig. 5 is a view similar to Fig. 1 but showing the knife roll assemblies disconnected from the drive connection and bearing supports.
Figure 7:
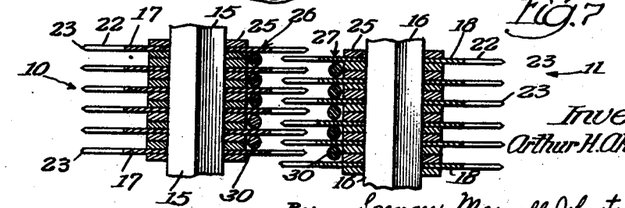
Fig. 7 is a detail sectional view on the line 7—7 of Fig. 2.
Figures 9, 10, 11, 12, 13:
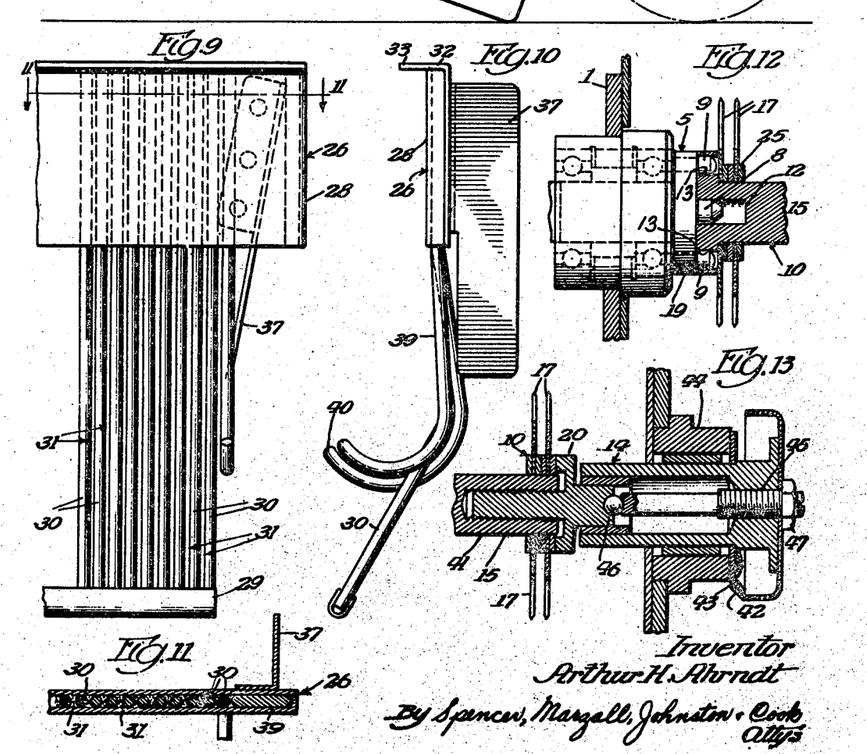
Fig. 9 is a detail elevational view of the front stripper member.
Fig. 10 is a detail end elevation of the front stripper member.
Fig. 11 is a detail sectional view on the line 11—11 of Fig. 9.
Fig. 12 is a detail sectional view on the line 12—12 of Fig. 6.
Fig. 13 is a detail sectional view on the line 13—13 of Fig. 1.

Front and rear knife roll assemblies 10 and 11, Figs. 2, 5, and 7, are provided with centering holes 12 and a plurality of peripheral holes 13, Fig. 12, to receive the driving pins 9. One end of the knife roll assemblies has interfitting driving engagement with the respective drive members 5 or 6, the opposite ends of the assemblies being supported in slidably mounted or removable bushings 14, Figs. 1, 5, and 13. The knife roll assemblies 10 and 11 comprise arbors or shafts 15 and 16, preferably angular in cross-section, carrying spaced apart disk knives or blades 17 and 18, respectively, Figs. 1, 2, 5, and 7. The driving end of each roll assembly includes a relatively large collar 19 fixed to its shaft and in which the receiving holes 13 are formed to receive the driving pins 9, Figs. 5 and 12. The opposite ends of the rolls 10 and 11 each has a relatively small collar 20, in the form of a nut, Fig. 2, which has flattened sides 21 to permit removal from the shafts for application or removal of the knives or blades. The knife assemblies rotate toward each other in accordance with the directional arrows, Figs. 2 to 4, so as to feed the meat to be tendered through the rolls.

Figure 3:
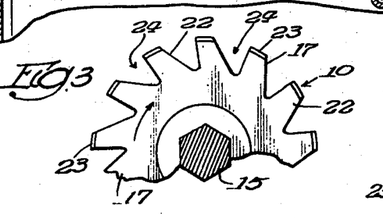
Figs. 3 and 4 are detail sectional views on the lines 3—3 and 4—4, respectively, of Fig. 5 and showing the manner in which the knives on the roll assemblies are arranged in staggered relationship.

The knives or blades 17 and 18 are in the form of disks having peripherally spaced teeth 22 provided with sharp piercing edges 23, the separate knives being so arranged on each shaft that the teeth on adjacent knives will not be in alinement, but instead will be opposite the space 24 between teeth, as clearly shown in Figs. 2 and 7. The forward edges of the teeth 22 are sloped or inclined rearwardly or away from the direction of rotation, as shown in Figs. 3 and 4, whereby the inclined edges move toward each other during opposite rotation of each knife roll assembly, Fig. 2. Spacer members 25 are provided to space the knives of each roll the proper distance apart. These spacer members may comprise disk members secured to opposite sides of each knife, as disclosed and claimed in applicant's co-pending application Serial No. 630,047, filed November 21, 1945. The knives on the shafts 15 and 16 are so arranged that the knives on one shaft will nest between the knives on the other shaft, whereby the knives 17 on the shaft 15 will be in the spaces between the knives 18 on the shaft 16, while the knives 18 on the shaft 16 will protrude into the spaces between the knives 17 on the shaft 15. The knives of each shaft therefore have overlapping relationship and co-operation, Figs. 2 and 7.

A front stripper member 26 and a rear stripper member 27, angularly configurated as shown in Figs. 2, and 6, are adapted to co-operate with the knife roll assemblies, the front stripper member 26 co-operating with the front roll assembly, and the rear stripper member 27 co-operating with the rear roll assembly.

Figure 8:
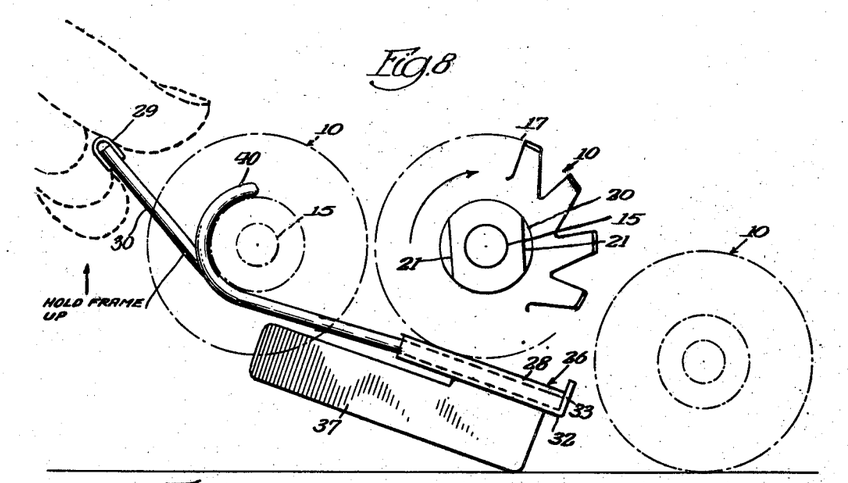
Fig. 8 is a detail elevational view of a stripper member and its associated knife roll assembly and showing the manner in which the roll assembly is released from its associated co-operating stripper member.

The stripper members 26 and 27 each comprises an upper supporting frame 28, see also Fig. 8, and a lower supporting frame 29. A plurality of rigid, spaced apart bars 30 are rigidly secured to the frames 28 and 29, as clearly shown in Fig. 9. The thickness of the bars 30 is slightly less than the distance between knives on a knife roll, while the spaces 31, Figs. 9 and 10, between bars 30 are slightly greater than the thickness of the knives 17 and 18, Fig. 7. The knives on each roll are adapted to fit into the spaces between the bars 30, and the bars 30 are adapted to fit into the spaces between adjacent knives, and, inasmuch as the knives 18 have interfitting relationship with the knives 17, the rear stripper member 27 will have its bars 30 substantially in alinement with the spaces 31 in the front stripper member 26. The upper frames 28 are each substantially U-shaped, as clearly shown in Figs. 2 and 6, so as to receive the longitudinal bars 30 in the manner shown in Fig. 11, the bars 30 being maintained rigidly to the upper frame in any conventional manner, such as by soldering, welding, and the like. The upper edge 32 of each upper frame 28 is provided with an outwardly extending flange 33, Figs. 2, 6, and 10, so as to permit the upper frame 28 to be easily grasped by the hand and to prevent the hand from slipping off during removal of the stripper member. The lower frames 29 each comprises a substantially U-shaped clip 34 which receives the lower ends of the bars 30 and is secured to the lower ends of the bars 30 in the same manner in which the upper ends of the bars 30 are secured to the upper frames 28. The lower frames 29 and the upper frames 28 hold the bars rigidly and in proper position, and form in effect a frame or plate of unitary construction. These frames 28 and 29 hold the bars 30 in proper rigid position, preventing the bars from spreading laterally and preventing the ends from moving out of their normal planes. Also, the lower frames 29 prevent any sinews or stringy parts of the meat from getting behind the stripper member and winding around the knife roll shafts.

The stripper members 26 and 27 are mounted in stripper supports 35. These supports 35 are mounted on each end of the machine inwardly of the side walls 1 and 2 (Fig. 5) and carry oppositely disposed properly aligned slots 36 to receive each end of the frames 28 of the respective stripper members 26 and 27, Figs. 2 and 6. The front stripper member has secured on its inner side at each end thereof a plate 37 in the form shown in Figs. 2, 3, 9, and 10, which slopes inwardly from the side edges, Fig. 9, so as to prevent the substance fed between the rolls from falling outwardly of the ends of the rolls. Similarly, the rear stripper member has secured on its inner side at each end thereof a plate 38 in the form shown in Fig. 2, which slopes inwardly from the side edges like the member 37 shown in Fig. 9, so as to prevent the substance fed between the rolls from falling outwardly of the ends of the rolls. The plates 37 and 38 on each end of the front and rear rolls, respectively, being secured to their respective frames 28, will form a substantially closed end, as shown in Fig. 2, when the stripper members 26 and 27 are arranged in operative position.

The stripper members 26 and 27 each carries downwardly extending hooks 39 and 40 at opposite ends thereof. The hooks 39 are smaller than the hooks 40 and are adapted to engage the collars 20 and 19, Figs. 1 and 5, the smaller hook 39 receiving the bearing end 20 of a knife assembly, while the larger hook 40 receives the larger collar 19 on the opposite end of the knife assembly. The hooks 39 and 40, therefore, are adapted to have the ends of the shaft supported thereby when the stripper members are removed. The proper knife assembly roll must therefore be positioned properly in the respective hook, and inasmuch as the ends of each of the rolls have different diameters, it is impossible to get a roll improperly positioned in a stripping member. The hooked ends of the hook members 39 and 40 are constructed with respect to the outer diameters of the collars 20 and 19, respectively, so that when the knife rolls 10 and 11 are in position the surfaces of the collars 19 and 20 will not quite touch the inner surfaces of the hooks. Therefore, there will be no frictional drag of the knife rolls on the collars. However, when the knife rolls are removed, an upward movement of a stripper member will cause the hooks 39 and 40 to come in contact with the collars 20 and 19, respectively, and cause gripping engaging of the collars to permit removal of the roll.

Fig. 6 discloses the method of removing the knife rolls 10 and 11. The knife rolls are moved preferably by first removing the front roll 10. This is accomplished by first removing the slidably mounted or removably mounted end bushings 14, and then shifting the stripped members to the left in Fig. 6, and to the right in Fig. 1, or from the position shown in the latter figure to the position shown in Fig. 5, the position in this latter figure showing the right hand edges of the frames against the inner surface of the right support 2, whereupon the driving connection between the rolls is disconnected, as shown in Fig. 5. The knife rolls, being disconnected from their driving end, may then be lifted upwardly and outwardly, as shown in Fig. 6. It is preferable that the front roll be removed first as it is in the most handy position. Therefore, when the stripper member 26 is raised upwardly, the hooks will engage the collars and the entire knife roll assembly 10 will be removed from the machine during the removal of the stripper member 26. When the front stripper member 26 with its co-operating knife assembly roll 10 has been removed, the rear knife assembly roll may be removed by merely raising the rear stripper member 27 upwardly, in the same manner described with respect to the front stripper 26 and front roll 10, Fig. 6.

The shafts 15 and 16 of the assembly rolls 10 and 11, respectively, carry at their right ends, Figs. 1 and 5, shaft extensions 41 which are adapted to be received in the openings provided in the removable or slidable bushing members 14. The bushing members 14 each carries a plurality of clips 42 which are adapted to have interlocking engagement with co-operating clips 43 mounted on collars 44 secured to the outer surface of the upright support 2, Figs. 5 and 13.

The knife assembly rolls 10 and 11 are adapted to be removed from the machine along with the removal of the stripper members 26 and 27. The bushing members 14 are first given a slight rotative movement to cause disengagement of the locking teeth 42 and 43, whereupon the bushing members 14 may be shifted to the right, Fig. 5, to cause disengagement with the shafts 15 and 16. The stripper members 26 and 27 are then shifted to the right, from the position shown in Fig. 1 to the position shown in Fig. 5, whereupon the rolls 10 and 11 will be engaged by the hooks on the front and rear stripper members 26 and 27. Upward pulling movement of the front stripper member, as shown in Fig. 6, will then cause the stripper member 26 to be disengaged from the slots 36 on the end members 35 and the entire front roll 10 may be removed. The rear roll 11 is removed in the same manner. The rolls 10 and 11 may be easily and instantly removed from its co-operating stripper member by inverting the stripper member and raising it, as shown in Fig. 8, whereupon the knife assembly roll will merely slide or roll off the stripper member in the manner shown in Fig. 8. Each knife assembly roll is therefore removed from the machine and removed from the stripper member without danger of the operator's hands coming in contact with the sharp edges of the knives.

The respective knife assembly rolls are prevented from shifting sideways in their bushings 14 during normal operation because the bushings 14 each carries a threaded shaft or stem 45 for engagement with a thrust bearing 46 on the proximate ends of the respective shafts. The stem 45 is screw threaded to permit proper adjustment and then locked in such proper adjustment by a locking nut 47, Fig. 13. The shafts 15 and 16 are therefore maintained in their proper operating position and longitudinal movement is prevented by the thrust stems or rods 45 and the thrust bearings 46.

The invention provides for the use of rigid stripper members co-operating with the knife rolls so that the knife assembly rolls may be removed during removal of the stripper members, the stripper members and the knife rolls acting as a single unit to permit such removal. The knife rolls are easily removed from the stripper members by merely permitting the rolls to roll off of the stripper members, in the manner shown in Fig. 8. The stripper members herein shown are rigid and durable in construction, permitting the spaced bars 30 to be maintained in proper spaced relationship and in their proper plane at the same time. It is, of course, understood that the conventional construction of spring finger combs may have the hooks 39 or 40 secured at opposite ends to permit removal of the rolls along with the spring finger combs. However, there is a disadvantage to spring finger combs in that it is difficult to assemble the fingers and maintain the fingers in proper spaced relationship as well as maintain them in the proper plane. Moreover, the conventional spring finger combs permit sinews or strings of meat to get between the fingers and wrap around the knife rolls. The present invention, however, overcomes the inherent disadvantage of spring finger combs by the provision of rigid stripper members having rigid supports at opposite ends, the lower rigid support preventing any sinews or other tissues of the meat from getting in between the bars and wrapping around the rolls.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A machine for operating on a substance and comprising a knife roll assembly member and a stripper member, said members being disconnected from and supported independently of each other and adapted to be removed as a unit from said machine, there being means carried by one of said members adapted to be brought into engagement with the other member when one member is being removed to support the other member to permit such removal as a unit.

2. A machine for operating on a substance and comprising a knife roll assembly member and a stripper member, said members being disconnected from and supported independently of each other and adapted to be removed as a unit from said machine, there being means carried by one of said members adapted to be brought into engagement with the other member when one member is being removed to support the other member to permit such removal as a unit, said last named means being hook-shaped and normally out of contacting engagement except upon removal.

3. A machine for operating on a substance and comprising a knife roll assembly member adapted to be removed from the machine, a stripper member separate from the knife assembly and adapted to be removed from the machine, and means on one of said members and adapted for co-operation with the other member whereby one member will be engaged by the other member during removal and be removed therewith as a unit.

4. A machine for operating on a substance and comprising a knife roll assembly member adapted to be removed from the machine, a stripper member adapted to be removed from the machine, and means on one of said members and adapted for co-operation with the other member whereby one member will be engaged by the other member during removal and be removed therewith as a unit, said means comprising a pair of spaced elements carried by one of said members, and movable into engagement with the other member.

5. A machine for operating on a substance and comprising a knife roll assembly member adapted to be removed from the machine, a stripper member adapted to be removed from the machine, and means on one of said members and adapted for co-operation with the other member whereby one member will be engaged by the other member during removal and be removed therewith as a unit, said means comprising a pair of spaced hook-shaped elements secured to a said member.

6. A meat tendering machine comprising a knife roll assembly adapted to be removed, a separate removable stripper member adapted for co-operation with the knife roll assembly, and means on said assembly and member adapted to be brought into co-operative relation for causing said assembly and stripper to be removed as a unit.

7. A meat tendering machine comprising a knife roll assembly adapted to be removed, a removable stripper member supported independently of and adapted for co-operation with the knife roll assembly, and co-operating means secured to the member and movable into engagement with the roll assembly during removal of the member, whereby the assembly will be carried by the member during removal thereof.

8. A meat tendering machine comprising a knife roll assembly adapted to be removed, a removable stripper member adapted for co-operation with the knife roll assembly, and co-operating means secured to the member and adapted for engagement with the roll assembly during removal of the member whereby the assembly will be carried by the member during removal thereof, said co-operating means comprising hook-shaped elements adapted to receive the roll assembly.

9. A meat tendering machine comprising a knife roll assembly, a stripper member adapted to have interfitting engagement with the knife roll assembly, means for mounting removably the roll assembly, means for mounting removably the stripper member, and means on the stripper member and engageable with the knife roll assembly when the stripper is removed to remove the knife roll assembly along with the stripper member as a unit.

10. A device for removing a knife roll assembly from a meat tendering machine and comprising a stripper member supported independently of and fixed within the machine, said stripper member co-operating with the assembly, and means on the stripper member movable into engagement with the knife roll assembly and supporting said assembly as the stripper member is being removed from the machine.

11. A meat tendering machine comprising a knife roll assembly consisting of a plurality of spaced apart tendering disk knives mounted on a shaft, means on the shaft exteriorly of the knives, a stripper member disconnected from the knife roll assembly and having spaced apart bars forming slots therebetween through which slots the knives operate, and means on the stripper member and movable into engagement with the said means on the shaft, when the stripper is removed, to cause removal of the knife roll assembly along with the stripper member.

12. A meat tendering machine comprising a knife roll assembly consisting of a plurality of spaced apart tendering disk knives mounted on a shaft, means on the shaft exteriorly of the knives, said means being dissimilar, a stripper member having spaced apart bars and forming slots through which slots the knives are adapted to operate, and dissimilar elements carried by the stripper member and adapted for engagement respectively with the dissimilar means on the shaft when the stripper is in the process of removal to cause removal of the knife roll assembly along with the stripper member.

13. A meat tendering machine comprising a knife roll assembly consisting of a plurality of spaced apart tendering disk knives mounted on a shaft, means on the shaft exteriorly of the knives, said means being dissimilar, a stripper member having spaced apart bars and forming slots through which slots the knives are adapted to operate, and dissimilar elements carried by the stripper member and adapted for engagement respectively with the dissimilar means on the shaft when the stripper is in the process of removal to cause removal of the knife roll assembly along with the stripper member, said dissimilar means comprising end collars and said dissimilar elements comprising downwardly extending members having bearing surfaces.

14. A stripper member for use with a knife roll assembly having spaced apart knife members mounted on a shaft, said stripper member comprising an upper frame, a lower frame, spaced bars secured to said frames, and depending members on the upper frame and adapted for engagement with the knife roll assembly to hold removably the knife roll assembly.

15. A stripper member for use with a knife assembly having spaced apart knife members mounted on a shaft, said stripper member comprising an upper frame, a lower frame, spaced bars secured to said frames, depending members on the upper frame and adapted for engagement with the knife roll assembly to hold removably the knife roll assembly, and vertical laterally inclined end members fastened to the upper frame exteriorly of the knife members.

16. A stripper member for use with a knife assembly having spaced apart knife members mounted on a shaft, said stripper member comprising an upper frame, a plurality of spaced apart members detached from the knife assembly and secured to said frame and extending therefrom, and means carried by the stripper member and adapted to be moved into engagement with the knife assembly, to receive the knife assembly, and adapted to hold the knife assembly whereby the assembly and stripper member may be removed as a unit from a meat tendering machine.

17. A stripper member for use with a removable knife assembly having spaced apart knife members mounted on a shaft, said stripper member comprising an upper frame, a plurality of spaced apart members secured to said frame and extending therefrom, a laterally extending projection on an upper end of the frame to provide a hand grasp for permitting the stripper to be easily inserted in or removed from a meat tendering machine, and means on the stripper for engagement with a portion of the knife assembly for simultaneously removing the knife assembly with the stripper member.

18. A stripper member for use with a knife assembly having spaced apart knife members mounted on a shaft, said stripper member comprising an upper frame, a plurality of spaced apart members secured to said frame and extending therefrom, means carried by the stripper member and adapted for engagement with the knife assembly to receive the knife assembly and adapted to hold the knife assembly whereby the assembly and stripper member may be removed as a unit from a meat tendering machine, a laterally extending projection on the upper edge of the frame to provide a hand grasp for permitting the stripper to be easily inserted in or removed from a meat tendering machine, side plates fastened to each end of the frame exteriorly of the knives and depending downwardly and at an angle inwardly, and means fastened to said frame and extending downwardly for engagement with the knife assembly.

19. A machine for tenderizing meat and other substances and comprising a pair of removable knife roll assemblies, each assembly having spaced apart knife members mounted on a shaft, the knife members of one assembly protruding into the spaces between the knife members on the other assembly, a demountable stripper member for each knife assembly and comprising a plurality of spaced apart bars extending between the knife members of its respective knife roll, each stripper member having a continuous upper frame and a continuous lower frame to which the bars are secured in spaced apart relationship, downwardly extending interiorly positioned flange members mounted at the ends of each frame and inclining laterally, and a downwardly extending member mounted on the upper frame of each stripper member and adapted for engagement with the knife roll which co-operates with the stripper member whereby removal of a stripper member will remove a knife roll.

20. A machine for tenderizing meat and other substances and comprising a pair of knife roll assemblies, each assembly having spaced apart knife members mounted on a shaft, the knife members of one assembly protruding into the spaces between the knife members on the other assembly, releasable bearing members for said shafts whereby the knife assemblies may be removed from the machine when released from the bearing members, a demountable stripper member for each knife assembly and comprising a plurality of spaced apart bars extending between the knife members of respective knife rolls, each stripper member having a continuous upper frame and a continuous lower frame to which the bars are secured in spaced apart relationship, and a downwardly extending means mounted on each stripper member and adapted to receive and hold a knife roll assembly when a roll is released from its bearing members, whereby a knife roll and a stripper member may be removed from the machine as a unit when the stripper member is removed.

21. A meat tendering machine having a stripper member for use with a removable knife assembly, said stripper member having spaced elongated slots in which the knives respectively operate, means removably supporting said stripper member, and means on said stripper member for engaging, supporting and removing said knife assembly when the stripper member is removed by one of its ends, the said knife assembly being disengageable from the stripper member and the said supporting means thereon when the stripper member is inverted.

22. A meat tendering machine having a stripper member for use with a removable knife assembly, said stripper member having spaced elongated slots in which the knives respectively operate, means removably supporting said stripper member, and means arranged on opposite sides of said stripper member for engaging, supporting and removing said knife assembly when the stripper member is removed by one of its ends, the said knife assembly being disengageable from the stripper member and the said supporting means thereon when the stripper member is grasped by the opposite end and inverted.

23. A meat tendering machine having a stripper member for use with a removable knife assembly, said stripper member having spaced elongated slots in which the knives respectively operate, means removably supporting said stripper member, and means on said stripper member for engaging, supporting and removing said knife assembly when the stripper member is removed by one of its ends, the said knife assembly being disengageable from the stripper member and the said supporting means thereon when the stripper member is grasped by the opposite end and elevated above the first said end, a portion of the stripper member having a surface serving as an incline down which the knife assembly will run.

24. A meat tendering machine having a stripper member for use with a removable knife assembly, said stripper member embodying a rigid body provided with spaced elongated slots and removably supported in the machine, in which slots the knives of said knife assembly operate, and means embodying a hook-shaped portion on the stripper member, movable into engagement with a portion of the knife assembly, whereby to raise and remove said knife assembly from the machine simultaneously with the removal of the stripper member.

25. A meat tendering machine having a stripper member for use with a removable knife assembly, said stripper member embodying a rigid body provided with spaced elongated slots and removably supported in the machine, in which slots the knives of said knife assembly operate and means embodying a hook-shaped portion on the stripper member, movable into engagement with a portion of the knife assembly, whereby to raise and remove said knife assembly from the machine simultaneously with the removal of the stripper member, said hook-shaped portion being disposed intermediate and spaced from the top and bottom of said stripper member.

26. A meat tendering machine having a stripper member for use with a removable knife assembly, said stripper member embodying a rigid body provided with spaced elongated slots and removably supported in the machine, in which slots the knives of said knife assembly operate, means embodying a hook-shaped portion on the stripper member, movable into engagement with a portion of the knife assembly, whereby to raise and remove said knife assembly from the machine simultaneously with the removal of the stripper member, and a handle on the stripper member for manipulating the latter.

27. A meat tendering machine having a stripper member for use with a removable knife assembly, said stripper member embodying a rigid body provided with spaced elongated slots and removably supported in the machine, in which slots the knives of said knife assembly operate, and means embodying a hook-shaped portion on the stripper member, movable into engagement with a portion of the knife assembly, whereby to raise and remove said knife assembly from the machine simultaneously with the removal of the stripper member, a portion of the body of said stripper member being shaped to form a handle for inserting the stripper into the machine and for removing it from the machine.

28. A meat tendering machine comprising a knife roll assembly including a shaft having spaced knives thereon, a frame removably supported by said machine, a plurality of rib means supported by said frame and having parts adapted to be received in the spaces between said knives, and means on the frame adapted to support the roll so that the rib means and roll may be removed as a unit from the machine when the frame is removed from the machine.

29. In a meat tendering machine, a knife roll and knife stripper means adapted to be removed from the machine as a unitary element and comprising a frame to which the stripper means are operatively mounted and means to which the knife roll is adapted to be supported, and means for supporting the frame demountably to the machine.

30. A meat tendering machine comprising a machine support, a frame removably mounted on the support, a plurality of spaced apart finger-like elements carried by the frame, and a knife roll adapted to be supported by said frame whereby said elements and knife roll may be removed as a unit along with the frame when the frame is removed from or is being mounted on said support, said knife roll including a plurality of spaced apart knives between which the elements are adapted to extend.

ARTHUR H. AHRNDT.

REFERENCES CITED

The following references are of record in the file of this patent:

UNITED STATES PATENTS

| Number | Name | Date |
| --- | --- | --- |
| 1,436,363 | Snyder | Nov. 21, 1922 |
| 1,964,089 | Spang | June 26, 1934 |
| 2,291,809 | Jackson | Aug. 4, 1942 |
| 2,364,533 | Jackson | Dec. 5, 1944 |